W. L. & J. A. SEDDON.
CALCULATOR FOR TARIFFS.
APPLICATION FILED SEPT. 23, 1910.
990,202.
Patented Apr. 18, 1911.
4 SHEETS—SHEET 1.
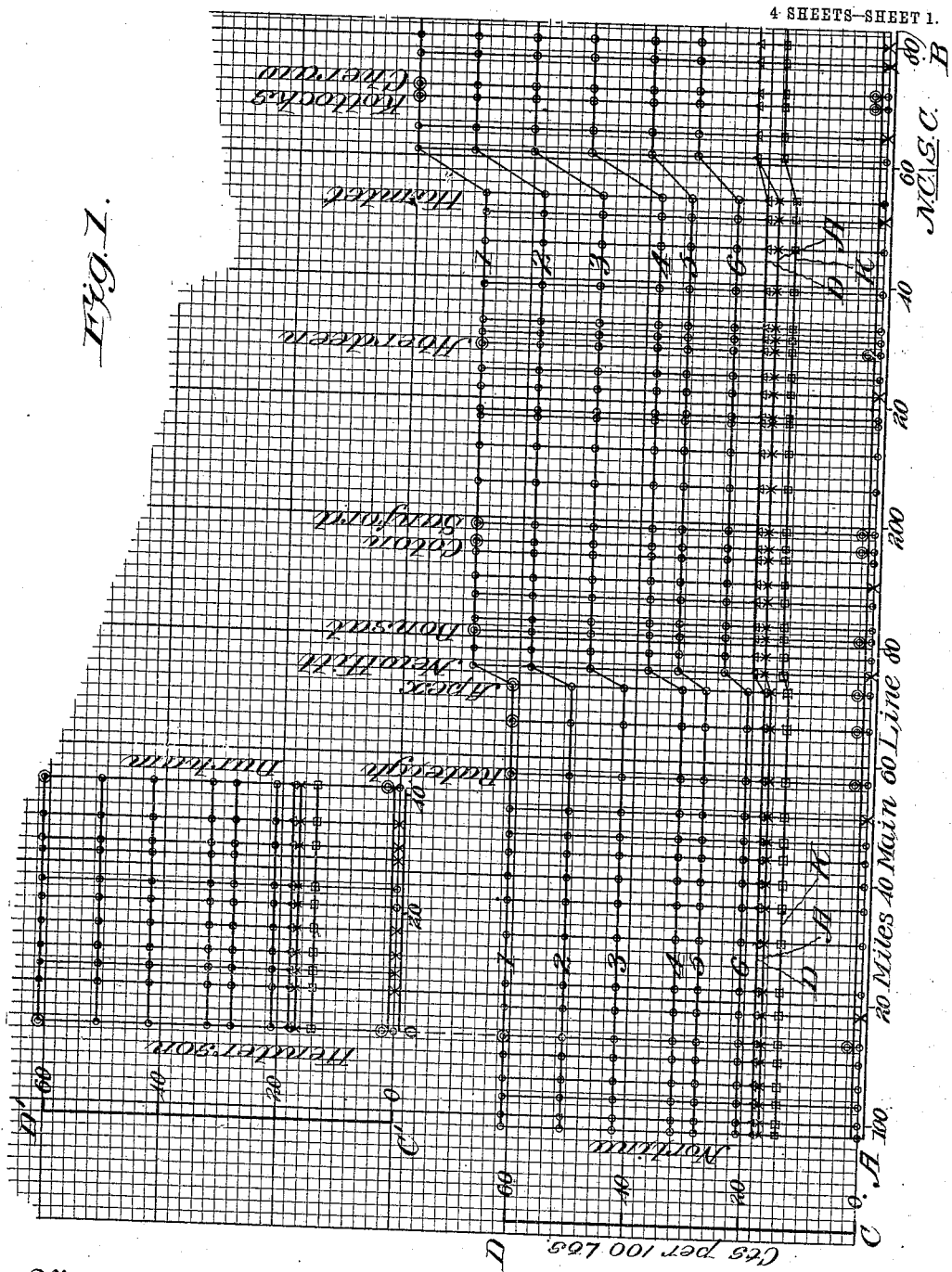
Witnesses
Byron B. Collings
Geo. A. Bifield
Inventors
William L. Seddon &
James A. Seddon
by Wilkinson, Fisher & Witherspoon
per Ernest Wilkinson
Attorneys.

W. L. & J. A. SEDDON.
CALCULATOR FOR TARIFFS.
APPLICATION FILED SEPT. 23, 1910.
990,202.
Patented Apr. 18, 1911.
4 SHEETS—SHEET 2.
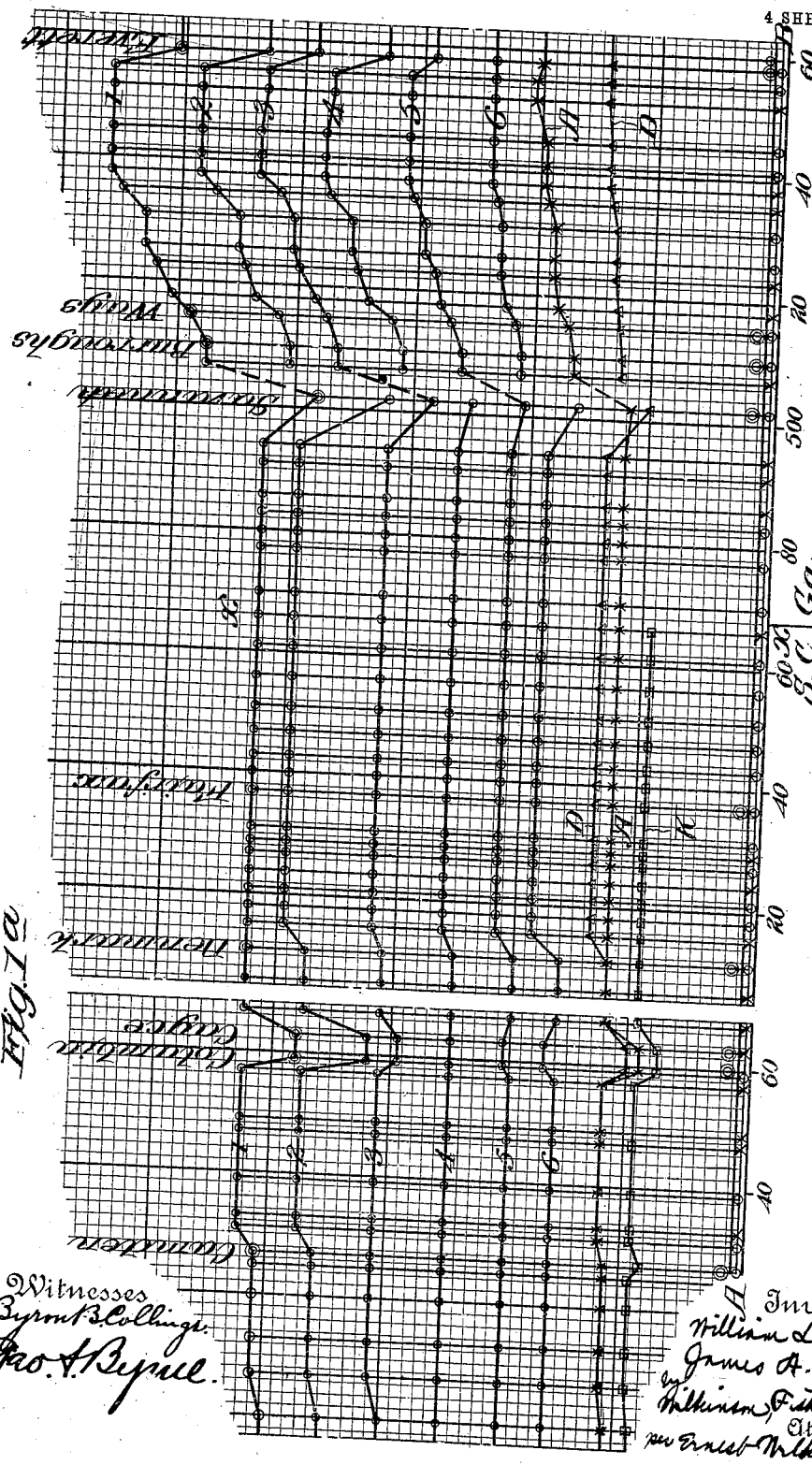

W. L. & J. A. SEDDON.
CALCULATOR FOR TARIFFS.
APPLICATION FILED SEPT. 23, 1910.
990,202.
Patented Apr. 18, 1911.
4 SHEETS—SHEET 3.
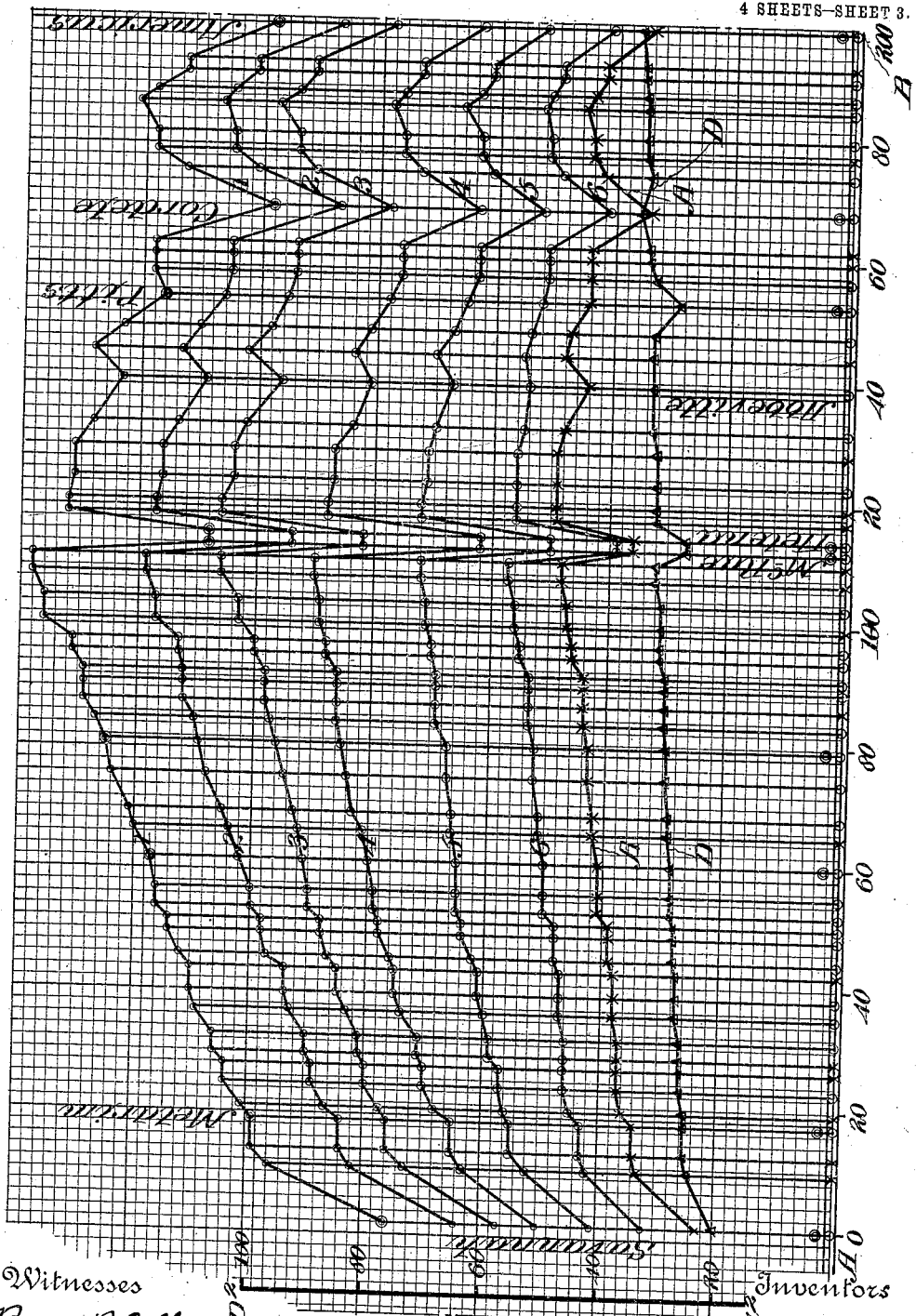

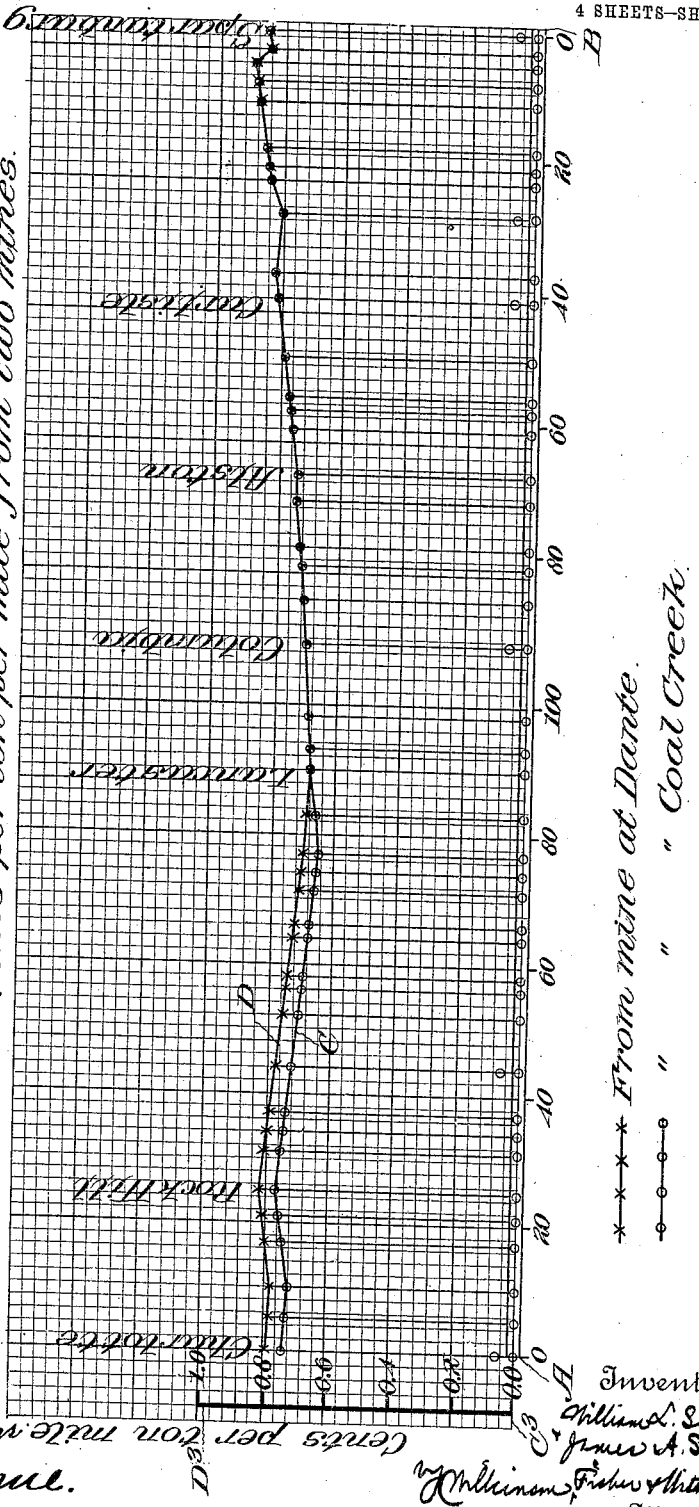

UNITED STATES PATENT OFFICE.

WILLIAM L. SEDDON AND JAMES A. SEDDON, OF PORTSMOUTH, VIRGINIA.

CALCULATOR FOR TARIFFS.

990,202.

Specification of Letters Patent.

Patented Apr. 18, 1911.

Application filed September 23, 1910. Serial No. 583,442.

*To all whom it may concern:*

Be it known that we, WILLIAM L. SEDDON and JAMES A. SEDDON, citizens of the United States, residing at Portsmouth, in the county of Norfolk and State of Virginia, have invented certain new and useful Improvements in Calculators for Tariffs; and we do hereby declare the following to be a full, clear, and exact description of the invention, such as will enable others skilled in the art to which it appertains to make and use the same.

Our invention relates to an improved system of presenting graphically the tariff rates for railroads or other common carriers, and it comprises a tariff chart graduated along one axis for distances or stations, and along the other axis for tariff rates of any kind. In general the vertical scale or axis of Y is taken to represent the tariff rate or value at any station, and preferably the horizontal scale or axis of X is taken to represent the railroad line or distance on which the location of the station is indicated; though diagonal lines may also be used for distance where tariff rates over a net work of railroads are to be shown altogether.

Under present conditions the railroad tariffs are issued in printed volumes, made up under the primary necessity for a rigid specification and indexing of all rates. In this form the sequence and relation of the rates are lost sight of, and an intelligent analyses of an extended tariff system is almost impossible.

Our invention is a graphic record of the tariff that brings out clearly the sequence and relation in its values; it may cover one or more railroad lines and branches on the same chart and as many of the class or commodity rates at each station as can be shown distinctly on the scales taken.

Our invention includes both the chart itself showing the data referred to, and the method of making the chart which will be hereinafter more fully described and claimed.

Reference is had to the accompanying drawings, in which the same parts are indicated by the same letters and numerals throughout the several views.

For convenience of reference, we have used tariff rates filed with the Interstate Commerce Commission for certain divisions of the Seaboard Air Line Railway and computed ton mile rates on coal for a certain division of the Southern Railway.

Figures 1 and 1ª show class rates between "the Virginia cities" and stations on the Seaboard Air Line Railway from Norlina, North Carolina, to Savannah, Georgia; with rates from "the Virginia cities" between Savannah and Everett, Georgia. Fig. 2 shows class rates from "the Virginia cities" to stations on the Seaboard Air Line Railway between Savannah, Georgia, and Americus, Georgia. Fig. 3 shows rates per ton per mile on coal to stations on the Southern Railway between Charlotte, North Carolina, and Spartanburg, South Carolina.

Referring now to Figs. 1 and 1ª, the line A—B shows the various stations along the Seaboard Air Line Railway between Norlina, North Carolina, and Everett, Georgia. This line is graduated to a scale on which one inch of the chart is taken to represent twenty miles of railroad, and the distances between the stations are shown to scale. The line corresponds to the horizontal distance scale or axis of X and is marked in miles on the Seaboard Air Line Railway from Richmond, Virginia, beginning at Norlina just before the 100 mile mark from Richmond. The tariff shown on the vertical scale or axis of Y is a common value for a group of cities—Lynchburg, Richmond, Norfolk, etc., known in railroad tariffs as "the Virginia cities;" each of course having a different distance to Norlina and stations beyond. The lines C—D and C'—D' at the left of Fig. 1 represent the tariff scale and are marked for rates in cents per hundred pounds of freight, each minor division representing 2 cents and the main divisions 20 cents. The heavy vertical lines or ordinates represent the respective stations, and the length of these ordinates between the base line A—B and the irregular tariff class lines hereinafter to be described, indicates graphically the tariff to said station in cents per hundred pounds.

The principal stations or junction points for common carriers, are preferably specially indicated at the ends of the corresponding ordinates, as by double circles, the local stations by single circles, and the minor stations, at which no agents are located, by cross marks. In general it will only be desirable to indicate the station by name, mark or number, at the top or bottom of the ordinate representing that station.

Joining the respective tariff rates at the stations and running in the same general direction as the axis of X are the irregular tariff class lines which indicate the tariff rates for the various classifications of freight shown on the chart and covering the bulk of the classified freight business. The freight charges on the thousands of varied commodities that in the development of the transportation system have become embodied in the numbered and lettered groups of this classification are shown in these class lines, with their sequence and their relations. The line 1—1 indicates the rates on first class freight; 2—2 on second class, and so on through the six numbered classes of the Southern classification; and the lines A—A, D—D, and K—K indicate a representative average of the lower rates through the lettered classes. Following these class lines it will be noted that long reaches of absolutely level rates, is a general characteristic of this rate structure; as for instance between Norlina and Apex, with identical rates through the branch line shown above from Henderson to Durham. Beyond Apex all the rates rise abruptly to a new level which runs through 79 miles to Hamlet. Beyond Hamlet on the main line the rates again rise abruptly to a new level that, with the addition of several minor rises, reaches to Savannah; while at Savannah all the rates drop to the Port level which controls there. It may be noted that Class 4 is the only line that passes through Columbia on the Seaboard Air Line Railway with a level rate, while the other classes show a local adjustment in the conflicting levels of the various railroads that meet there.

Fig. 2 shows the rates from the same Virginia cities—Lynchburg, Richmond, Norfolk, etc.—to the Seaboard Air Line Railway stations between Savannah, Georgia, and Americus, Georgia. The lines are numbered as before and the ordinates represent the various stations along the Savannah-Montgomery division of the Seaboard Air Line Railway. The scale $C^2$ $D^2$ to the left covers from 20 cents to 100 cents per one hundred pounds of freight. This line of railroad is approximately a cross line to the movement of freight from "the Virginia cities"; located also in what is more properly Savannah territory. The class rate lines show a corresponding type of rate structure; and there will be noted the marked depressions in the rates at Helena, Cordele and Americus which are junction points with other railroads having more direct routes than that of the Seaboard Air Line Railway.

Figs. 1, 1$^a$ and 2 give an illustration of two of the different types to be found in rate structures; and it will be noted that our invention brings out the distinctive characteristics of these types, so that they may be recognized immediately.

Fig. 3 shows an application of our invention to a comparison of the coal rates from two mining districts, represented by the rates from Coal Creek, Tennessee, and Dante, Virginia, respectively. For the purpose of this comparison rates per ton per mile are required, in place of the flat rates filed with the Interstate Commerce Commission. The line A—B represents the scale locating the stations on the Southern Railway between Charlotte, North Carolina, and Spartanburg, South Carolina. The ordinates from this line represent the rates at each station. $C^3$ $D^3$ represent the rate scale graduated to decimals of a cent per ton per mile; and the ton mile rates are marked on the station ordinates as crosses from Dante and circles from Coal Creek respectively. The irregular lines joining the rate marks at the stations correspond to the class rate lines of Figs. 1, 1$^a$ and 2. It will be noted that the rates from the two coal fields differ from Charlotte to Lancaster and practically coincide from Lancaster to Spartanburg. In this case Spartanburg is the terminus of the railroad leading to the Dante coal fields. And it is a fact, whether by intention or by the process of competition, that a differential between the coal fields is established over this territory, which corresponds to a practical identity in ton mile rates for coal routed through this terminus; while Charlotte to Lancaster shows a part of the line served by a different routing.

It will be seen that ton mile rates or other functions of the rates may be used in many cases, and that the same general scheme may be followed in these cases as that used in showing the class rates and their relations. It will be obvious also that the same methods may be used to make charts for other railroads, waterways and common carriers in general.

The essence of the invention comprises one or more points to be shown or indicated which form the group or origin to which the tariff especially applies, a base line on which the tariff is to be shown having noted thereon in consecutive order the various termini or stations for the origin or destination of the freight carried, and a series of ordinates which represent functions of the rate charged.

It will be obvious that various modifications might be made in the herein described method and product which might be used, without departing from the spirit of our invention.

Having thus described our invention, what we claim and desire to secure by Letters Patent of the United States is:

1. A common carrier tariff chart applicable to one or more points as an origin, and comprising a base line graduated to represent stations along the route, and a series of parallel lines intersecting said base line, one line running from each station, the length of each of said parallel lines representing a function of the tariff rate between said origin and the station through which the said line passes, the said parallel lines being divided into lengths commensurate with the various classes of goods or commodities to be transported, with continuous lines joining the divisions on each of said parallel lines, whereby a graphic representation of the various tariff rates for classes or commodities is secured, substantially as described.

2. A common carrier tariff chart applicable to one or more points as an origin, and comprising a base line graduated to represent distances and stations along the route, and a series of ordinates running from said graduations, the length of each ordinate representing a function of the tariff rate between said origin and the station through which the ordinate passes, the said ordinates being divided into lengths commensurate with the various classes of goods or commodities to be transported, with continuous lines joining the divisions on each ordinate, whereby a graphic representation of the various tariff rates for classes or commodities is secured, substantially as described.

3. A common carrier tariff chart applicable to one or more points as an origin, and comprising a base line graduated to represent stations along the route, and a series of parallel lines intersecting said base line, one line running from each station, the length of each of said parallel lines representing the tariff rate between said origin and the station through which the said line passes, the said parallel lines being divided into lengths commensurate with the various classes of goods or commodities to be transported, with continuous lines joining the divisions on each of said parallel lines, whereby a graphic representation of the various tariff rates for classes or commodities is secured, substantially as described.

4. A common carrier tariff chart applicable to one or more points as an origin, and comprising a base line graduated to represent consecutively stations along the route, and a series of ordinates running from said graduations, the said ordinates being divided into lengths commensurate with the tariff rates on the various classes of goods or commodities to be transported, with continuous lines joining the divisions on each ordinate, whereby a graphic representation of the various tariff rates for classes or commodities is secured, substantially as described.

In testimony whereof, we affix our signatures, in presence of two witnesses.

WILLIAM L. SEDDON.
JAMES A. SEDDON.

Witnesses:
R. R. GIGHILLIAT,
MARY T. MOORE.

---

Copies of this patent may be obtained for five cents each, by addressing the "Commissioner of Patents, Washington, D. C."